United States Patent [19]

Ikoma et al.

[11] Patent Number: 5,700,596

[45] Date of Patent: Dec. 23, 1997

[54] NICKEL HYDROXIDE ACTIVE MATERIAL POWDER AND NICKEL POSITIVE ELECTRODE AND ALKALI STORAGE BATTERY USING THEM

[75] Inventors: Munehisa Ikoma, Shiki-gun; Norikatsu Akutsu, Kamakura; Masashi Enokido; Fumihiko Yoshii, both of Fujisawa; Hideo Kaiya, Chigasaki; Shingo Tsuda, Fujisawa, all of Japan

[73] Assignee: Matsushita Electric Industrial Co., Ltd., Osaka, Japan

[21] Appl. No.: 795,845

[22] Filed: Nov. 21, 1991

[30] Foreign Application Priority Data

Jul. 8, 1991 [JP] Japan .................. 3-194923
Jul. 8, 1991 [JP] Japan .................. 3-194931

[51] Int. Cl.$^6$ .............. H01M 4/32; H01M 4/88; H01M 6/04
[52] U.S. Cl. .............. 429/206; 252/182.1; 423/594; 429/223
[58] Field of Search .............. 252/182.1; 429/223, 429/232, 206; 423/594

[56] References Cited

U.S. PATENT DOCUMENTS

| | | | |
|---|---|---|---|
| 3,752,706 | 8/1973 | Melin | 429/223 |
| 4,844,999 | 7/1989 | Oshitani et al. | 429/223 |
| 4,985,318 | 1/1991 | Oshitani et al. | 429/223 |
| 5,569,444 | 10/1996 | Blanchard et al. | 429/223 |

FOREIGN PATENT DOCUMENTS

| | | |
|---|---|---|
| 0284333 | 9/1988 | European Pat. Off. . |
| 0337029 | 10/1989 | European Pat. Off. . |
| 2029770 | 10/1970 | France . |
| 59-112574 | 6/1984 | Japan . |
| 61-104565 | 5/1986 | Japan . |
| 6316555 | 1/1988 | Japan . |
| 230061 | 1/1990 | Japan . |
| 332461239 | 10/1992 | Japan . |

OTHER PUBLICATIONS

M. Watada, et al "Development of a High–Density Pasted Nickel Electrode and Battery", Process of the 34th International Power Sources Symposium, Jun. 25, 1990, pp. 299–304.

Masahiko Oshitani "High energy nickel electrode and its application to secondary batteries", Technical Report of Electronic Information and Communication Society, vol. 90, No. 47 pp. 43–48, 1991.

*Primary Examiner*—Wayne A. Langel

[57] ABSTRACT

The tap density of nickel hydroxide powders is improved, the expansion of a positive electrode is inhibited and the energy density of the positive electrode and the cycle life characteristics are improved by specifying the shape of the nickel hydroxide powders and besides, adding to the nickel hydroxide powders at least one of Cd, Ca, Zn, Mg, Fe, Co and Mn. The nickel hydroxide active material powders contain 1–7 wt % of at least one of Cd, Ca, Zn, Mg, Fe, Co and Mn and comprise a mixture of spherical or nearly spherical particles and non-spherical particles.

50 Claims, 7 Drawing Sheets

NICKEL HYDROXIDE ACTIVE MATERIAL POWDER AND NICKEL POSITIVE ELECTRODE AND ALKALI STORAGE BATTERY USING THEM

BACKGROUND OF THE INVENTION

The present invention relates to an alkali storage battery in which a nickel oxide is used for a positive electrode, and a hydrogen absorbing alloy capable of carrying out electrochemical hydrogen absorbing and desorbing reactions, cadmium or zinc used for a negative electrode. More particularly, it relates to the improvement of the nickel oxide (nickel hydroxide) and the characteristics of the positive electrode.

Lead storage batteries and nickel.cadmium storage batteries (hereinafter referred to as "NiCd battery") which are practically used as present are widely used in portable apparatuses. The lead storage batteries are inexpensive, but are generally low in energy density (Wh/kg) per unit weight and have problems in cycle life, and thus these batteries cannot be said to be suitable as electric sources for small and light portable apparatuses. On the other hand, since the NiCd batteries are higher in energy density per unit weight and unit volume than lead storage batteries and are superior in reliability such as cycle life, they are widely used as the electric sources of various portable apparatuses. However, since load for batteries increases with increase of the added value of portable apparatuses, secondary batteries of a higher energy density have been desired earnestly as the electric sources of portable apparatuses. In the field of NiCd batteries, there have been developed NiCd batteries which are higher by 30–60% in capacity than those which use a conventional sintered type nickel positive electrode. Furthermore, there have been developed nickel.hydrogen storage batteries having a negative electrode made of a hydrogen absorbing alloy which are further higher in capacity than NiCd batteries (more than twice). In order to improve the energy density of a positive electrode, in these alkali storage batteries of a high capacity, a three dimensional sponge-like nickel porous body or a nickel fiber porous body of a high porosity (higher than 90%) filled with nickel hydroxide powders is used as the positive electrode. Therefore, the energy density of the conventional sintered type nickel positive electrode is 400–450 mAh/cm$^3$, while that of the above-mentioned nickel positive electrode is 500 mAh/cm$^3$. As the nickel hydroxide powders packed in the three-dimensional porous body are used powders in a non-spherical state, which are prepared by drying and compacting nickel hydroxide fine powders obtained by precipitation from nickel sulfate and an alkali and then grinding the compacted fine powders. However, such positive electrode has the problem of a low cycle life, though it is higher in energy density than the sintered type nickel positive electrode. This is because γ-NiOOH of a high volume is produced in the positive electrode during charging and expands the positive electrode to absorb the electrolyte present in a separator, thereby to increase the internal resistance of the battery and reduce the discharge capacity. In order to solve the problem, the following methods have been proposed.

(1) Method of inhibiting the production of γ-NiOOH by adding cadmium oxide powders to nickel hydroxide powders.

(2) Method of inhibiting the production of γ-NiOOH at charging by adding powders of zinc, zinc oxide or zinc compounds to nickel hydroxide powders. (JP-A-59-112574).

(3) Method of containing a cadmium oxide in nickel hydroxide powders or inhibiting the production of γ-NiOOH at charging by adding 3–10 wt % of zinc or cadmium in the form of solid solution and preventing the growth of internal fiber pores of more than 30 Å in pore radius and controlling the total pore volume to less than 0.05 cm$^3$/g. (JP-A-61-104565 and JP-A-2-30061 and U.S. Pat. No. 4,844,999.)

According to these methods, since nickel hydroxide powders of a non-spherical state are used, it is impossible to further increase the packing density into the three-dimensional porous body. Therefore, the energy density of the positive electrode reaches the limit. According to the methods of the above (1) and (2), production of γ-NiOOH is inhibited by adding cadmium oxide powders or zinc oxide powders to nickel hydroxide powders thereby to improve the cycle life characteristics, but the improvement of the life characteristics is not so remarkable. Especially, with increase in capacity, namely, with increase in the energy density of the positive electrode, the effect obtained by the addition of cadmium oxide powders or zinc oxide powders decreases. This suggests that it is difficult to inhibit the production of γ-NiOOH by mere addition of cadmium oxide powders of zinc oxide powders. Accordingly, it is necessary to improve the particle structure or crystal structure of active material powders. Furthermore, according to the methods of the above (3), as in the conventionally proposed other methods, since cadmium oxide, or zinc or cadmium in the form of solid solution is allowed to be present in the crystal of nickel hydroxide powders, the production of γ-NiOOH at charging is inhibited and the cycle life can be prolonged as compared with when cadmium oxide or zinc oxide powders are mixed with nickel hydroxide. However, since the packing density into the positive electrode is improved by preventing the growth of internal fiber pores of more than 30 Å, the electrolyte penetrates into particles of nickel hydroxide with difficulty and utilization of active material at initial charging and discharging is low, namely, about 70%. Moreover, because of difficulty in penetration of the electrolyte into particles of nickel hydroxide, the non-homogeneity of the electrolyte inside the nickel hydroxide particles occurs, resulting in localized increase in current density and easy production of γ-NiOOH. As a result, the cycle life in an atmosphere at a low temperature (0° C.) is about 300 cycles. Furthermore, since ammonium sulfate is used in the step of production of nickel hydroxide, ammonium is present in nickel hydroxide powders as an impurity and this ammonium accelerates self-discharge of battery.

SUMMARY OF THE INVENTION

The present invention solves the above problems.

A principal object of the present invention is to provide a nickel hydroxide active material and a nickel positive electrode which are improved in packing density by a simple construction, has a high energy density and excellent in cycle life characteristics and an alkali storage battery in which the nickel hydroxide active material and the nickel positive electrode are used.

Another object of the present invention is to provide a nickel hydroxide active material and a nickel positive electrode which are high in utilization of the nickel hydroxide active material at initial charging and discharging and excellent in self-discharge, and an alkali storage battery in which the nickel hydroxide active material and the nickel positive electrode are used.

In order to solve the above problems, according to the present invention, a mixture of spherical or nearly spherical particles and non-spherical particles which comprises nickel hydroxide powders containing 1-7 wt % of at least one metal selected from the group consisting of cadmium, calcium, zinc, magnesium, iron, cobalt and manganese is used as nickel hydroxide active material powders used for nickel positive electrode. Furthermore, according to the present invention, the nickel hydroxide active material powders comprise nickel hydroxide powders containing 1-7 wt % of at least one metal selected from the group consisting of cadmium, calcium, zinc, magnesium, iron, cobalt and manganese and comprise an aggregate of innumerable primary particles having a particle size of 0.1 μm or less and in which the void volume of pores having a radius of at least 30 Å is 20-70% for total void volume. The present invention further provides a nickel positive electrode which comprises a three-dimensional porous body or flat sheet which is filled or coated with nickel hydroxide powders and at least one selected from the group consisting of cobalt, cobalt oxide, zinc oxide, zinc, cadmium and cadmium oxide.

Further, the present invention provides an alkali storage battery comprising a nickel positive electrode mainly composed of nickel oxide, a negative electrode mainly composed of a hydrogen absorbing alloy capable of carrying out electrochemical hydrogen absorbing and desorbing reaction or a negative electrode mainly composed of cadmium oxide, an alkali electrolyte and a separator wherein before initial charging and discharging, said nickel positive electrode is mainly composed of a three dimensional porous body or a flat sheet which imparts electrical conductivity and supports nickel hydroxide powders comprising a mixture of spherical or nearly spherical particles and non-spherical particles which comprises nickel hydroxide active material powders containing 1-7 wt % of at least one metal selected from the group consisting of cadmium, calcium, zinc, magnesium, iron, cobalt and manganese and additionally containing at least one selected from the group consisting of cobalt, cobalt oxide, zinc oxide, zinc, cadmium, and cadmium oxide, and the specific gravity of the alkali electrolyte is 1.23-1.4, and the amount of the electrolyte per 1 Ah of battery capacity is 1.0-2.0 $cm^3$/Ah.

By employing the above construction, packing density and cycle life characteristics can be improved by using a mixture of spherical or nearly spherical particles and non-spherical particles comprising nickel hydroxide active material powders containing 1-7 wt % of at least one metal selected from the group consisting of cadmium, calcium, zinc, magnesium, iron, cobalt and manganese in preparation of the positive electrode. That is, by mixing spherical or nearly spherical particles with non-spherical particles, nickel hydroxide powders can be efficiently allowed to exist in the void between particles and hence, the packing density of nickel hydroxide is improved when a positive electrode is produced using the above-mentioned powder mixture. Production of γ-NiOOH which is larger than β-NiOOH in volume can be inhibited at overcharging by adding 1-7 wt % of at least one metal selected from the group consisting of cadmium, calcium, zinc, magnesium, iron, cobalt, and manganese to nickel hydroxide active material powders. As a result, expansion of the active material and the positive electrode can be inhibited and cycle life characteristics can be improved.

Furthermore, by adjusting the void volume having a pore radius of 30 Å or more to 20-70% of total pore volume, the penetration of the electrolyte into particles becomes easy and the production of γ-NiOOH caused by partial presence of the electrolyte inside the particles can be inhibited. Moreover, since the nickel hydroxide active material powders comprise innumerable primary particles of 0.1 μm or less in particle size, the utilization of an active material at initial charging and discharging is improved.

For the nickel positive electrode, there is the problem that the substantial energy density is low even if the packing density is improved by using the nickel hydroxide powders of the present invention. Therefore, utilization of the nickel hydroxide active material is improved by adding cobalt and cobalt hydroxide into the positive electrode. As a result, since the utilization of the nickel hydroxide active material is improved, even if a positive electrode having an increased packing density is used, a substantial energy density corresponding to the packing density can be obtained. Besides, production of γ-NiOOH of a high volume at overcharging can be further inhibited by the addition of zinc oxide, zinc, cadmium and cadmium oxide. As a result, expansion of the nickel positive electrode is prevented and charging and discharging cycle life is improved. Therefore, a positive electrode which is high in energy density and excellent in cycle life characteristics can be obtained by filling or coating a three-dimensional porous body or a flat sheet with the nickel hydroxide powders and the above additives according to the present invention.

In the alkali storage battery comprising the positive electrode of the present invention, a negative electrode mainly composed of a hydrogen absorbing alloy capable of carrying out electrochemical hydrogen absorbing and desorbing reaction or a negative electrode mainly composed of cadmium oxide, an alkali electrolyte and a separator, supply of proton to nickel hydroxide becomes easy and utilization of nickel hydroxide active material is improved by employing the alkali electrolyte having a specific gravity of 1.23-1.4. Furthermore, when the amount of the electrolyte is 1.0-2.0 $cm^3$/Ah (per capacity of positive electrode), the electrolyte can be properly distributed in the positive electrode, the negative electrode and the separator and an alkali storage battery having an excellent cycle life can be obtained.

DESCRIPTION OF THE PREFERRED EMBODIMENTS

The present invention will be illustrated by the following examples.

EXAMPLE 1

The nickel hydroxide powders used in this example were prepared in the following manner.

Figure 1:
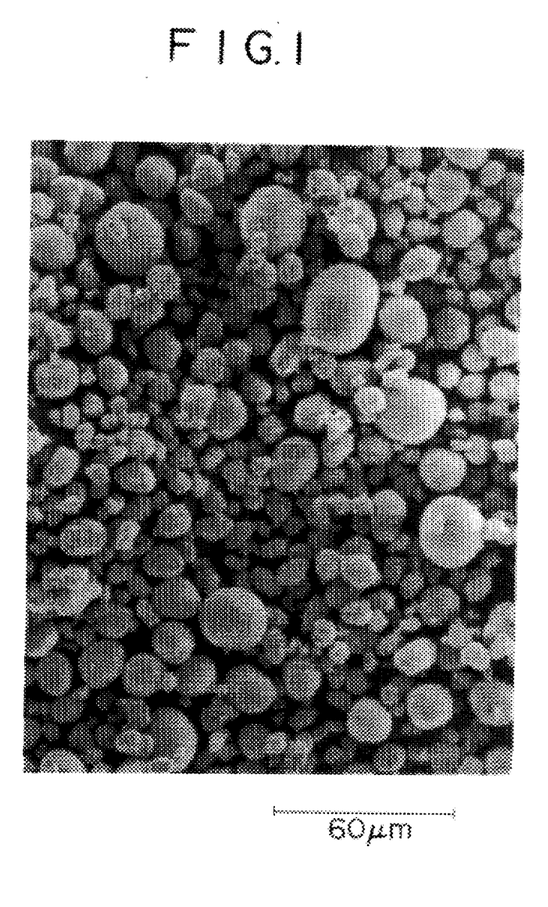
FIG. 1 is a whole electron photomicrograph of nickel hydroxide powders comprising a mixture of spherical and non-spherical particles prepared according to the present invention.
Figure 2:
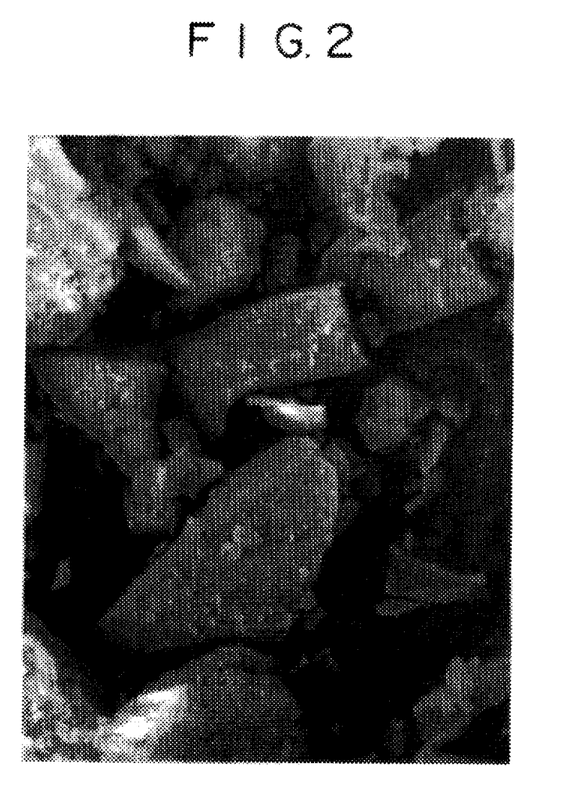
FIG. 2 is a whole photograph of square-shaped nickel hydroxide of a comparative example.

The nickel hydroxide powders comprised nickel hydroxide containing 3.7 wt % of zinc and 0.5 wt % of cobalt. Nickel sulfate, cobalt sulfate and zinc sulfate were dissolved in water at a given ratio to prepare a mixed aqueous solution in which ions of nickel, cobalt and zinc were dissolved. Then, a given amount of this mixed aqueous solution and a given amount of sodium hydroxide were fed to a reaction tank at a residence time in the reaction tank of 20 l/hr, a temperature of 35° C. and a pH of 11.3 kept with an aqueous sodium hydroxide solution under vigorous stirring to prepare primary particles of 0.1 μm or less and with using these particles as nuclei, nickel hydroxide comprising spherical particles and non-spherical particles containing 3.7 wt % of zinc and 0.5 wt % of cobalt was continuously prepared. The resulting nickel hydroxide powders are shown in FIG. 1. As can be seen from FIG. 1, powders having a particle size of about 10–30 μm are spherical and those having a particle size of less than about 10 μm are non-spherical. Such mixed powders comprising spherical and non-spherical powders can be obtained under the above-mentioned production conditions, namely, by carrying out the reaction at a relatively low temperature of 35° C. and at a low pH of 11.3 and by controlling the stirring condition and the residence time in the reaction tank. As a comparative example, square powders were used which were prepared by drying the nickel hydroxide fine powders as shown in FIG. 2 precipitated from nickel sulfate and an aqueous alkali solution of high concentration, compacting the powders and then grinding them. The average particle size of the nickel hydroxide powders of the present invention and the comparative example was both about 12 μm.

Then, in order to know packing property of the nickel hydroxide powders of the present invention and those of the comparative example in a positive electrode, tap density was measured and the results are shown in Table 1. The tap density was obtained in the following manner: Nickel hydroxide powders were packed in a 20 cc measuring cylinder of A g in weight and the powders were tapped 200 times, thereafter the weight B g of the measuring cylinder (containing the nickel hydroxide powders) and the volume D cc of the nickel hydroxide were measured, and the density was calculated from the formula: Tap density=(B−A)/D.

TABLE 1

Comparison of tap density and packing density

|  | The present invention | Comparative Example |
|---|---|---|
| Tap density g/cc | 2.01 | 1.60 |
| Packing density mAh/cc | 630 | 580 |

The packing density was measured in the following manner: Respective nickel hydroxide powders were packed in a sponge-like nickel porous body having a porosity of 95% and a basis weight of 350 g/m$^2$, this was pressed under a given pressing condition and cut to a given length, and the thickness was measured and the packing density was calculated. The tap density and packing density of nickel hydroxide of the present invention and the comparative example are shown in Table 1. As is clear from the comparison on the tap density and packing density shown in Table 1, the nickel hydroxide powders of the present invention are higher in tap density and superior in packing density as compared with those of the comparative example. This is because since the nickel hydroxide powders of the comparative example were in the square form and many voids were present between the particles as compared with spherical particles, tap density and packing density were not improved. On the other hand, since the nickel hydroxide powders of the present invention comprised a mixture of spherical particles and non-spherical particles, the non-spherical particles were packed in the voids between the spherical particles. As a result, the nickel hydroxide powders showed excellent characteristics of 2.01 g/cc in tap density and 630 mAh/cc in packing density.

Next, in order to examine the charging and discharging cycle characteristics of the nickel hydroxide active material powders, a nickel.hydrogen storage battery was fabricated by the following method. The positive electrode was made by mixing the above nickel hydroxide powders of the present invention, cobalt powders and cobalt hydroxide powders at a weight ratio of 100:7:5, adding water to the mixture and kneading it to prepare a paste, packing the paste in a sponge-like nickel porous body support having a porosity of 95% and a surface density of 300 g/m$^2$, drying and pressing the porous body, then immersing it in an aqueous solution in which fluoro resin powders were dispersed, thereafter again drying it and then cutting it to a given size to make a nickel positive electrode having a capacity of 1400 mAh. As a comparative example, a nickel positive electrode was made in the same manner as above using the above square nickel hydroxide powders.

A negative electrode was made in the following manner. Alloy composition was 3.6 MmNi 0.7 Co 0.4 Mn 0.3 Al (Mm means amish metal which is a mixture of rare earth elements). Mish metal Mmwhich is a mixture of rare earth elements, Ni, Co, Mn, and Al were charged in an arc furnace and kept at a vacuum of $10^{-4}$–$10^{-5}$ torr and then subjected to arc discharging under a reduced pressure in an argon atmosphere to melt them. For homogeneization, the sample was heat treated at 1050° C. for 6 hours in vacuum. The resulting alloy ingot was roughly ground and then, milled by a wet-type ball mill to obtain powders of 20 μm in average particle size. The powders were subjected to a treatment in a 7.2 mol aqueous potassium hydroxide solution at 80° C. for 1 hour with stirring, then washed with water to remove potassium hydroxide from the alloy powders, and dried to obtain a hydrogen absorbing alloy powders to be used for a negative electrode. To the hydrogen absorbing alloy powders were added water and carboxymethyl cellulose (CMC) to obtain a paste. A sponge-like nickel porous body of 95% in porosity was filled with the paste and dried. The porous body was pressed and cut to a given size to obtain a hydrogen absorbing alloy negative electrode. A sulfonated nonwoven fabric comprising polypropylene and polyethylene was used as a separator.

Figure 3:
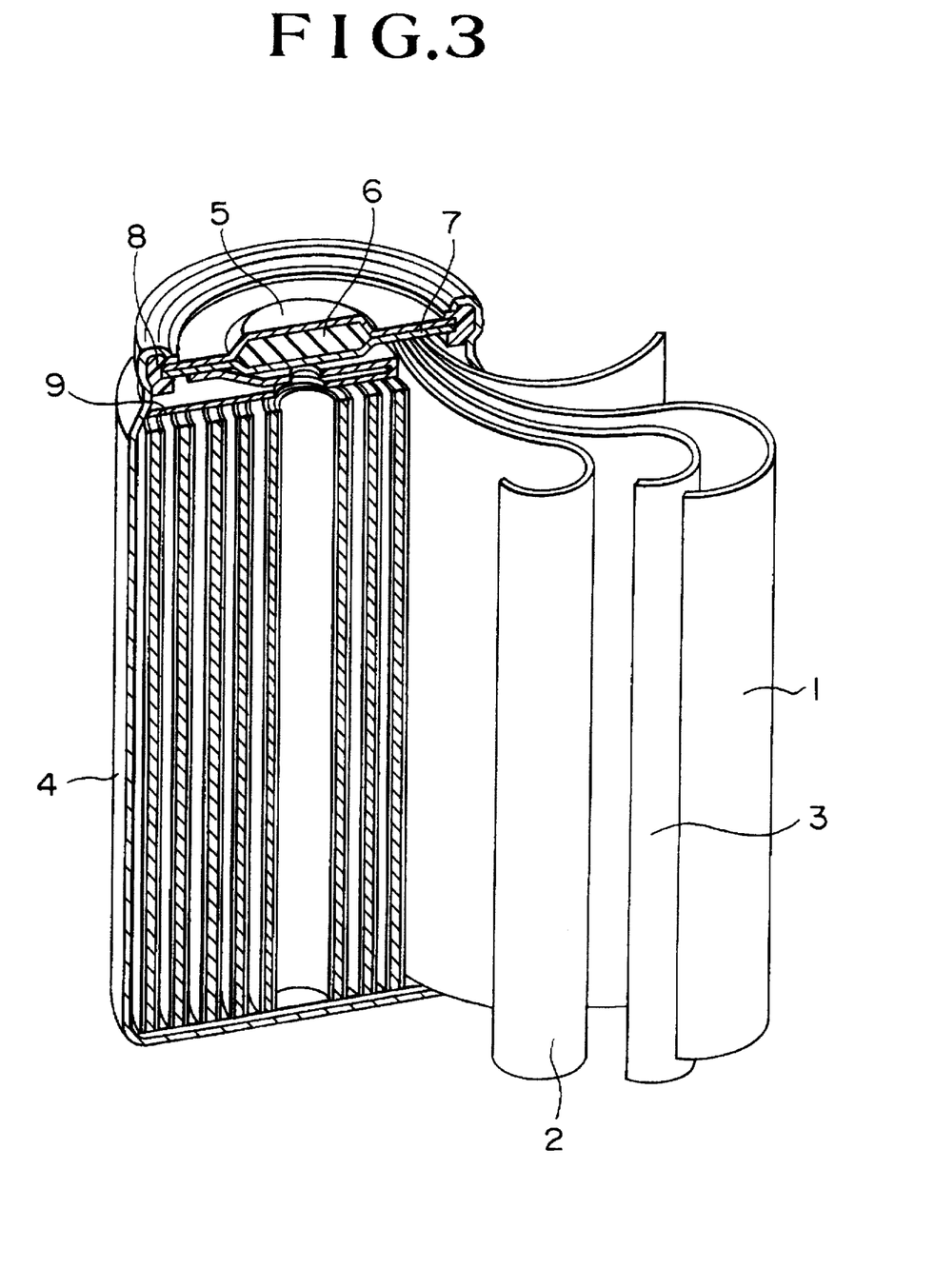
FIG. 3 is a sectional view of a nickel.hydrogen storage battery made according to the present invention.
Figure 4:
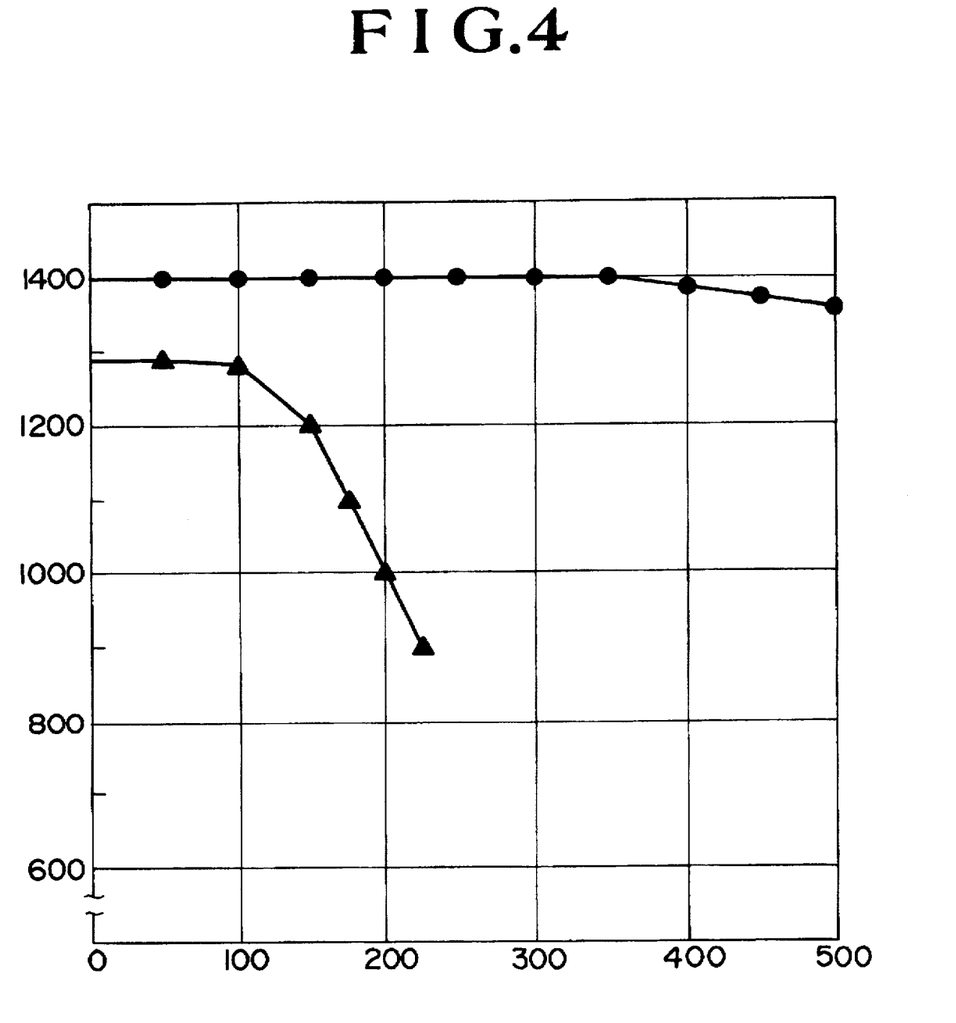
FIG. 4 is a graph which shows the cycle life of batteries in which the nickel hydroxide of the present invention and that of the comparative example are used.

The thus produced negative electrode 1 and positive electrode 2 were wound in a spiral form with providing a separator therebetween and were inserted in case 4 which also serves as a negative electrode terminal. Thereafter, 2.8 cm$^3$ of an alkali electrolyte prepared by dissolving 20 g/l of lithium hydroxide in an aqueous potassium hydroxide solution and having a specific gravity of 1.30 was poured into the case and the case 4 was sealed by sealing plate 7 provided with safety valve 6 to make an enclosed nickel.hydrogen storage battery of 4/5 A in size having a capacity of 1400 mAh and controlled in its battery capacity by the positive electrode. The structure of the resulting battery is shown in FIG. 3. In FIG. 3, 8 indicates an insulating gasket, and 9 a positive electrode current collector which electrically connects positive electrode 2 with sealing plate 7. A storage battery made using a positive electrode comprising the conventional nickel hydroxide was also made in the same construction as shown in FIG. 1. Since the positive electrode comprising the conventional nickel hydroxide was low in packing density, battery capacity was 1290 mAh. These batteries were subjected to the charging and discharging cycle life test under the following conditions. That is, the charging and discharging cycle was repeated in an atmosphere of 0° C. The one cycle comprised carrying out charging for 4.5 hours at ⅓ CmA and then discharging to 1.0 V at 1 CmA. The results are shown in FIG. 4. It can be seen therefrom that the battery in which the positive electrode comprising the nickel hydroxide of the present invention was used was higher in the level of capacity than the battery of the comparative example and showed substantially no decrease of capacity even after repetition of the charging and discharging of 500 cycles. On the other hand, the battery in which the positive electrode comprising the conventional nickel hydroxide was lower about 8% in the level of capacity at initial charging and discharging and decreased in capacity after repetition of 200 charging and discharging cycles. This is because the nickel hydroxide powders of the present invention comprised a mixture of spherical and non-spherical particles and, hence, was high in volume density and, besides, the nickel hydroxide powders contained 3.7 wt % of zinc and 0.5 wt % of cobalt.

This example showed the case where the non-spherical particles were smaller than the spherical particles in particle size. The similar results are obtained also when the spherical particles are smaller than the non-spherical particles in particle size or when the spherical particles and the non-spherical particles are mixed with optional particles sizes and at mixing ratios.

EXAMPLE 2

Nickel hydroxide powders were prepared in the same manner as in Example 1 in order to examine the effects of cadmium, calcium, zinc, magnesium, iron, cobalt and manganese contained in the nickel hydroxide powders. The resulting powders comprised a mixture of the spherical particles or nearly spherical particles and the non-spherical particles as shown in FIG. 1. The compositions of the resulting powders are shown in Table 2 and Table 3.

TABLE 2

| Composition of nickel hydroxide (weight ratio) | | | | |
|---|---|---|---|---|
| No. 1 | No. 2 | No. 3 | No. 4 | No. 5 |
| Zn = 0 | Zn = 1 | Zn = 3 | Zn = 5 | Zn = 6.7 |
| Co = 0 | Co = 0.3 | Co = 0.3 | Co = 0.3 | Co = 0.3 |
| Total = 0.0 | Total = 1.3 | Total = 3.3 | Total = 5.3 | Total = 7 |

TABLE 3

| Composition of nickel hydroxide (weight ratio) | | | | | |
|---|---|---|---|---|---|
| No. 6 | No. 7 | No. 8 | No. 9 | No. 10 | No. 11 |
| Cd = 3 | Mg = 3 | Zn = 3 | Zn = 3 | Zn = 3 | Zn = 3 |
| Co = 0.0 | Co = 0.3 | Ca = 1 | Fe = 1 | Mn = 1 | Mg = 1 |
| Total = 3.3 | Total = 3.3 | Total = 4 | Total = 4 | Total = 4 | Total = 4 |

Figure 5:
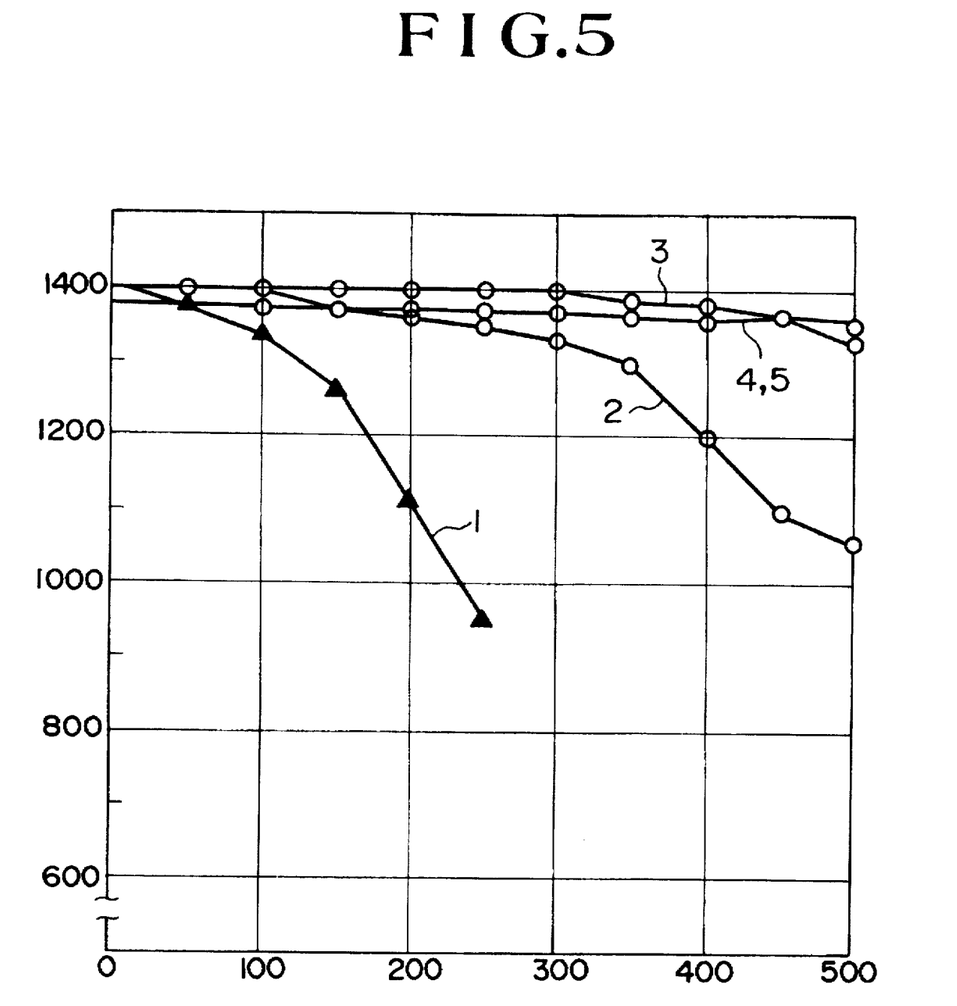
FIGS. 5 and 6 are graphs which show the cycle life of batteries in which nickel hydroxides having various compositions are used.
Figure 6:
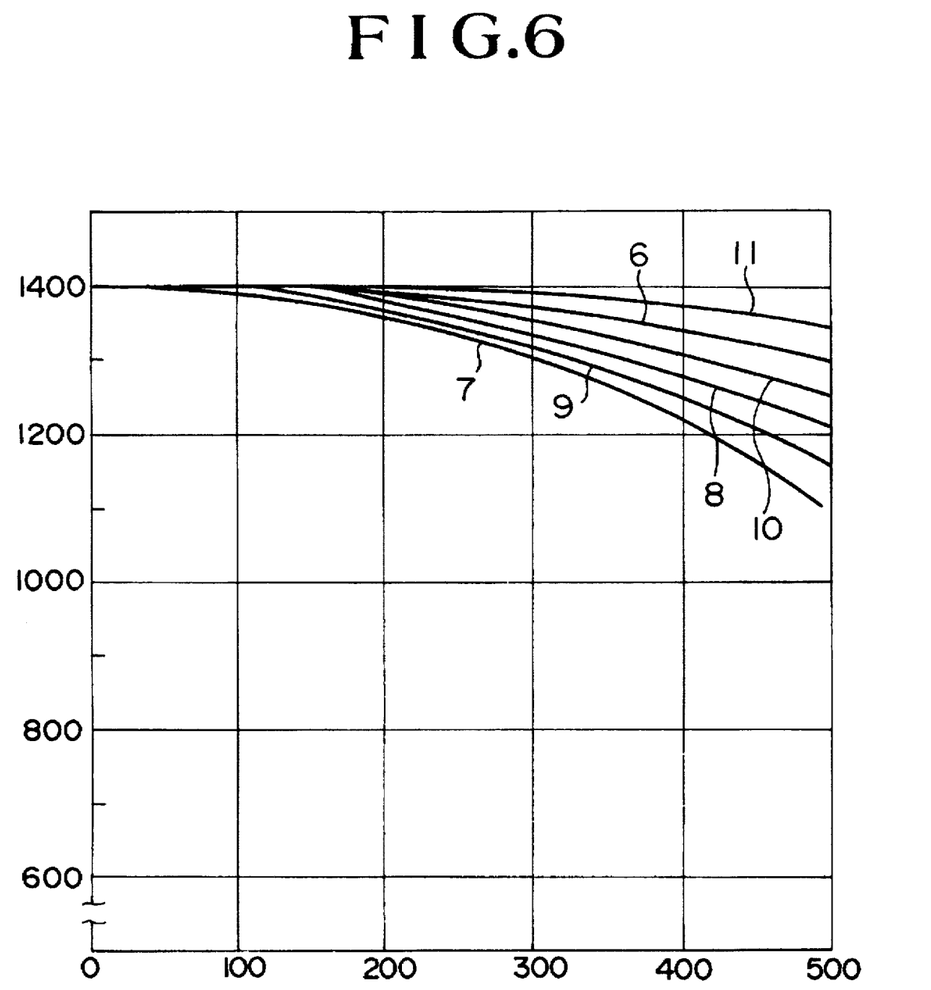

The tap density of the nickel hydroxide powders Nos. 1–11 was 1.92–2.15 g/cm³ and the average particle size thereof was 9–15 μm. In order to improve the packing density in production of the positive electrode, the tap density must be at least 1.9 g/cm³. Moreover, the average particle size of nickel hydroxide is preferably within the range of 7–20 μm from the viewpoints of the packing property in making the positive electrode and the flowability of the paste prepared by mixing nickel hydroxide with water. Next, in order to examine the life characteristics of these nickel hydroxide, positive electrodes and batteries were constructed in the same manner as in Example 1 and the tests were conducted thereon. The results are shown in FIGS. 5 and 6. As can be seen from FIGS. 5 and 6, batteries Nos. 2–11 in which the nickel hydroxide of the present invention was used showed substantially no reduction of capacity even after repetition of 500 charging and discharging cycles. On the other hand, it was found that the battery of No. 1 reduced in its capacity by repetition of 250 cycles since it did not contain zinc and cobalt. As shown in FIG. 5, the battery of No. 2 reduced in its capacity to about 75% of the initial capacity after repetition of 500 cycles though it contained 1.3 wt % of zinc and cobalt. Therefore, it is considered that the amount of zinc and others added is required to be 1 wt % or more. If the amount is more than 7 wt %, the volume density decreases and, hence, addition in an amount of 7 wt % or less is preferred. With reference to the amount of cobalt added, if it is more than 1 wt %, reduction of voltage is considerable at discharging of a high rate and hence, the amount is preferably 1 wt % or less. It is considered that cadmium, calcium, zinc, magnesium, iron, cobalt and manganese in the nickel hydroxide are present in the form of a solid solution formed by substitution for a part of nickel of nickel hydroxide or in the form of a hydroxide.

EXAMPLE 3

In the same manner as in Example 1, various mixtures of spherical of nearly spherical particles and non-spherical particles which contained 3.7 wt % of zinc and 0.5 wt % of cobalt were prepared with changing the reaction pH from 11.0 to 11.6 in the reaction of producing nickel hydroxide. The properties of nickel hydroxide prepared under various pH conditions are shown in Table 4.

TABLE 4

| | Properties of spherical nickel hydroxide powders | | | | | |
|---|---|---|---|---|---|---|
| No. | Reaction pH | Tap density g/cm² | Average particle size μm | Specific Surface area m²/g | Void volume ratio % | Total void volume cm²/g |
| A | 11.0 | 2.3 | 10.6 | 8.6 | 17 | 0.01 |
| B | 11.1 | 2.2 | 15.4 | 13.7 | 68 | 0.015 |
| C | 11.3 | 2.1 | 13.3 | 18.3 | 43 | 0.02 |
| D | 11.5 | 1.9 | 8.5 | 20.0 | 25 | 0.04 |
| E | 11.6 | 1.8 | 6.8 | 25.6 | 78 | 0.06 |

The void volume ratio in Table 4 is a ratio of the volume of voids having a pore radius of 30 Å or more to the total volume of voids having a pore radius of 10–200 Å (calculated from adsorption isothermal curves of adsorption side of nitrogen gas). Measurements of pore distribution having a pore radius of less than 10 Å is difficult by the method of using nitrogen gas and it is considered that void having pores having a radius of less than 10 Å is actually present.

Next, enclosed nickel.hydrogen storage batteries of 4/5 A size having a capacity of 1400 mAh were made in the same manner as in Example 1 using the nickel hydroxide powders A–E in Table 4. These batteries were tested on the utilization factor of active material of nickel hydroxide which is a positive electrode active material under the following conditions. Charging was carried out at a positive electrode capacity 150% based on the theoretical capacity calculated from the nickel hydroxide active material with a charging current of 0.1 CmA in an atmosphere of 20° C. and was ceased for 1 hour and then continuous discharging was carried out to 1.0 V with a constant discharging current of 0.2 CmA. Such charging and discharging were repeated 5 times and the utilization factor of active material in each cycle was calculated. The utilization factor of active material was calculated by the following formula.

Utilization factor of active material=(discharging capacity to 1.0 V/theoretical capacity of nickel hydroxide)×100

The results of the tests on the active material utilization factor of the batteries in which the nickel hydroxide of A–E was used are shown in Table 5.

TABLE 5

Utilization factor in 1–5 cycles of various nickel hydroxides

| No. | Utilization factor/% | | | | |
|---|---|---|---|---|---|
|  | 1 cycle | 2 cycles | 3 cycles | 4 cycles | 5 cycles |
| A | 80 | 82 | 85 | 85 | 85 |
| B | 90 | 92 | 94 | 95 | 95 |
| C | 93 | 95 | 98 | 98 | 98 |
| D | 92 | 94 | 97 | 97 | 97 |
| E | 95 | 95 | 96 | 96 | 96 |

As can be seen from Table 5, the utilization factor of nickel hydroxide of No. A was 80% for the first cycle and was 85% after repetition of 5 cycles of charging and discharging. This is because the void volume having a pore radius of more than 30 Å was 17% of a total void volume. This correlates with the facts that the specific surface area was 8.6 m$^2$/g and the total void volume was small, namely, 0.01 cm$^2$/g. Therefore, penetration of the electrolyte into pores of nickel hydroxide particles was difficult and, as a result, effective nickel hydroxide participating in the charging and discharging reactions decreased and the utilization factor was small, namely, 80–85%. The nickel hydroxide powders of No. E had a low tap density of 1.8 g/cm$^3$. The reason for the low tap density is that the specific surface area and total void volume were large and the average particle size was small. This nickel hydroxide was superior in utilization factor, but was difficult to fill in a high density because of a low tap density. The utilization factor of nickel hydroxide Nos. B, C and D of the present invention was 90–93% in the first cycle and showed an excellent value of 95–98% even after repetition of 5 cycles.

From the above, nickel hydroxide powders excellent in utilization factor can be obtained by controlling the reaction pH to the range of 11.3±0.2. The total void volume is preferably within the range of 0.015–0.04 cm$^3$/g from the points of utilization factor and tap density. It is preferred that the void volume having a pore radius of 30 Å or more is at least 20% of the total void volume. Specific surface area is preferably 10–20 m$^2$/g from the points of utilization factor and filling property.

Next, in order to know how self-discharging characteristics of a battery of the same construction as No. C change when ammonia remains in nickel hydroxide, batteries of No. C-1 and No. C-2 which contain ammonia in an amount of 0.05 wt % and in an amount of 0.01 wt % based on nickel hydroxide, respectively were produced, the other constructions were the same as in No. C of Example 1. The self-discharging characteristics were tested under the following conditions. Charging was carried out for 15 hours with 0.1 CmA in an atmosphere of 20° C. and was ceased for 1 hour, and then, discharging was carried out to 1.0 V with a discharging current of 0.2 CmA and discharging capacity (A) was calculated. Then, charging was carried out for 15 hours with 0.1 CmA in an atmosphere of 20° C. and was left to stand for 14 days in an atmosphere of 45° C. at charged state, and then, discharging was carried out to 1.0 V with a discharge current of 0.2 CmA in an atmosphere of 20° C., and discharge capacity (B) was calculated. Next, the capacity maintaining rate which represents the self-discharge characteristics was obtained by the following formula.

Capacity maintaining rate (%)=Discharge capacity (B)/Discharge capacity (A)×100

The self-discharge characteristics of No. C of the present invention and Nos. C-1 and C-2 as comparative examples are shown in Table 6. As can be seen from Table 6, when ammonia was contained in the batteries, the capacity maintaining rate decreased when they were left to stand at high temperatures.

TABLE 6

Self-discharge characteristics of batteries

| No. | C | C-1 | C-2 |
|---|---|---|---|
| Capacity maintaining rate % | 75.2 | 5.0 | 15.3 |

Therefore, when nickel hydroxide is prepared by producing a complex of ammonia, ammonia remains in nickel hydroxide powders even if washing with water is sufficiently carried out and hence the self-discharge characteristics deteriorate. On the other hand, the nickel hydroxide powders of the present invention contain no ammonia in the course of production and excellent self-discharge characteristics are exhibited.

EXAMPLE 4

The positive electrodes as shown in Table 7 were produced using the same nickel hydroxide of the present invention as in Example 1 and in the same manner as in Example 1.

TABLE 7

| | Composition of positive electrode (weight ratio) | | | |
|---|---|---|---|---|
| No. | Nickel hydroxide | Cobalt | Cobalt hydroxide | Zinc oxide |
| F | 100 | 0 | 0 | 0 |
| G | 100 | 9 | 0 | 0 |
| H | 100 | 7 | 5 | 0 |
| I | 100 | 7 | 5 | 3 |

Then, the same batteries as a Example 1 were produced using the positive electrodes Nos. F–I in combination with the negative electrode used in Example 1. These batteries were subjected to the tests on the utilization factor of nickel hydroxide which is a positive active material and the charge and discharge cycle life under the following conditions. Charging was carried out at a positive electrode capacity 150% based on the theoretical capacity calculated from the nickel hydroxide active material with a charging current of 0.1 CmA in an atmosphere of 20° C. and was ceased for 1 hour and then continuous discharging was carried out to 1.0 V with a constant discharging current of 0.2 CmA. Such charging and discharging were repeated twice and the utilization factor of active material in the second cycle was calculated. The utilization factor of active material was calculated by the following formula.

Utilization factor of active material=(discharge capacity to 1.0 V/theoretical capacity of nickel hydroxide)×100

The charging and discharging cycle life was determined in the following manner. That is, charging was carried out with a charging current of 1 CmA for 1.3 hour in an atmosphere of 0° C. and, thereafter, continuous discharging was carried out to 1.0 V with a discharging current of 1.0 CmA. Charging and discharging were repeated under the above conditions and when discharging time reduced to 60% of the initial continuous discharging time, the number of cycles at that point was taken as cycle life. The results of the active material utilization factor and cycle life of Nos. F-I are shown in Table 8.

TABLE 8

Active material utilization factor and cycle life

| No. | Utilization factor of active material | Cycle life |
|---|---|---|
| F | 82.3% | 590 cycles |
| G | 95.5% | 525 cycles |
| H | 95.0% | 530 cycles |
| I | 94.8% | 750 cycles |

Also when the nickel hydroxide powders of the present invention shown in Example 1 were used, the active material utilization factor and charging and discharging cycle life characteristics differed depending on the composition of positive electrode shown in Table 7. When the positive electrode was constructed of only the nickel hydroxide powders No. F of the present invention, the active material utilization factor was low, namely, 82.3%. On the other hand, when the positive electrodes Nos. G–I of the present invention were used, the active material utilization factor was excellent, namely, 94.8–95.5%. When the nickel hydroxide of the present invention is used, it is necessary for improving the utilization factor to allow cobalt or cobalt hydroxide to be present together with nickel hydroxide. The amounts of cobalt and cobalt hydroxide added are preferably 4–18 parts by weight and 0–10 parts by weight based on 100 parts by weight of the nickel hydroxide powders from the point of substantial discharging capacity, respectively. That is, if the amount of cobalt is less than 4 parts by weight, the utilization factor reduces and the substantial discharge capacity reduces. If the amount of cobalt is more than 18 parts by weight, the active material utilization factor is superior, namely, at least 95%, but the substantial capacity reduces because the packing density reduces. The amount of cobalt hydroxide added shows the similar tendency and, hence, the above-mentioned range is preferred.

With reference to the charging and discharging cycle life, at least 500 cycles of charging and discharging are possible even in an atmosphere of 0° C. if the positive electrodes have the compositions of No. F–I. When the positive electrode No. I containing zinc oxide was used, the cycle life was very good, namely, 750 cycles. Therefore, in order to obtain further superior life characteristics, it is necessary to allow zinc oxide to be present together with nickel hydroxide powders. The amount of zinc oxide added is suitably 0–10 parts by weight based on 100 parts by weight of nickel hydroxide. If it is more than 10 parts by weight, the active material utilization factor decreases to less than 90%. Cadmium oxide, cadmium, zinc, etc. have the similar effect to improve the cycle life, and the amount of them is preferably within the range of 0–10 parts by weight.

In this example, a sponge-like nickel porous body having a surface density of 300 g/m$^2$ was used as a support, but the similar effect is exhibited when the surface density is within the range of 200–700 g/m$^2$. Further, a punching metal or a flat sheet which is a kind of three-dimensional porous body show the same effect as sponge-like nickel porous body.

EXAMPLE 5

The same batteries as of Example 1 were produced using the nickel hydroxide powders of the present invention prepared in Example 1 and the positive electrode of No. I in Example 4 with changing the specific gravity and the amount of the electrolyte. The numbers of the batteries produced and the relation between the specific gravity and the amount are shown in Table 9. These batteries were tested on the utilization factor and cycle life in the same manner as in Example 3 and the results are also shown in Table 9.

TABLE 9

Relations between specific gravity, amount of electrolyte, utilization factor and cycle life

| No. | Specific gravity of electrolyte | Amount of electrolyte | Utilization factor | Cycle life |
|---|---|---|---|---|
| J | 1.20 | 2.4 cc | 88.2% | 760 cycles |
| K | 1.23 | 2.4 cc | 93.5% | 770 cycles |
| L | 1.30 | 2.4 cc | 94.8% | 750 cycles |
| M | 1.40 | 2.4 cc | 96.0% | 650 cycles |
| N | 1.43 | 2.4 cc | 93.2% | 450 cycles |
| O | 1.30 | 1.3 cc | 88.2% | 430 cycles |
| P | 1.30 | 1.4 cc | 90.1% | 500 cycles |
| Q | 1.30 | 2.0 cc | 93.5% | 700 cycles |
| R | 1.30 | 2.8 cc | 94.8% | 800 cycles |
| S | 1.30 | 3.0 cc | 95.0% | 600 cycles |

The battery of No. J was 88.2% in utilization factor and battery capacity decreased when the specific gravity of the electrolyte was low, namely, 1.20. In the case of No. N high in the specific gravity of electrolyte, namely, 1.43, the cycle life was low, namely, 450 cycles. On the other hand, in the case of Nos. K–M, the utilization factor was 93.5–96% and cycle life was 650–770, namely, they had excellent characteristics. Therefore, the optimum range of the specific gravity of the electrolyte is 1.23–1.40 of Nos. K–M. Since the battery of No. O in which the amount of electrolyte was 1.3 cc was insufficient for the nickel hydroxide of the present invention, both the utilization factor and the cycle life were deteriorated. The battery of No. S in which the amount of the electrolyte was 3.0 cc had a superior utilization factor of 95%, but was lower in cycle life than when the amount of electrolyte was 2.8 cc. This is because since the amount of electrolyte was large, when charging was carried out with a current value of 1 CmA, the absorption reaction at negative electrode of oxygen gas generated from the positive electrode at overcharging took place with difficulty and the gas or the electrolyte leaked from the safety valve to cause the deterioration of the cycle life. The capacity of Nos. P–R was 1.4 Ah, the amount of the electrolyte per Ah was 1.0, 1.43, and 2.0, respectively. From the above, the specific gravity of the alkali electrolyte is preferably 1.23–1.40 and the amount of the electrolyte is preferably 1.0–2.0 cm³/Ah. When the amount of lithium hydroxide (LiOH) contained in the electrolyte is less than 10 g/l, discharging voltage markedly decreases and, hence, it is contained preferably in an amount of at least 10 g/l. In this example, an $AB_5$ hydrogen absorbing alloy was used for the negative electrode, but the similar results are obtained when AB and $AB_2$ hydrogen absorbing alloy negative electrodes of, for example, a titanium type, cadmium negative electrodes or zinc negative electrodes are used.

EXAMPLE 6

Figure 7:
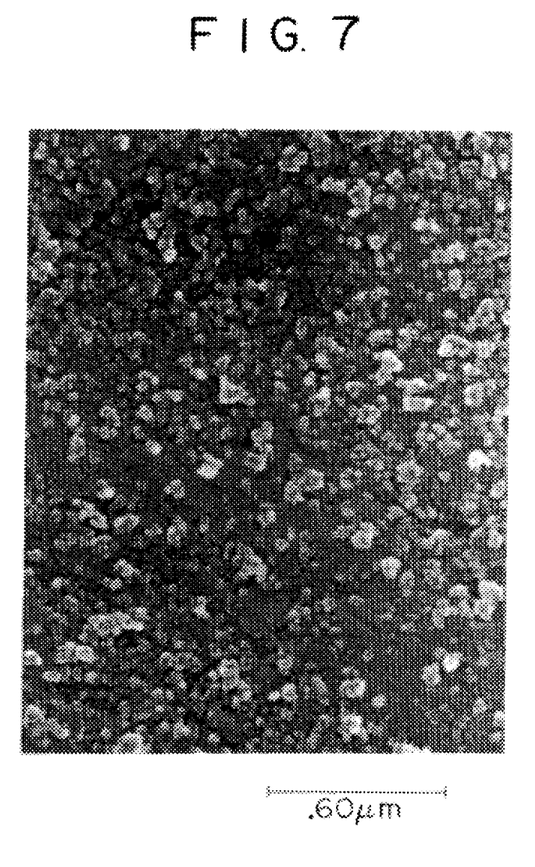
FIG. 7 is an enlarged electron photomicrograph of a section of the nickel hydroxide powder prepared according to the present invention.

The nickel hydroxide powder used in this example was prepared in the following manner. The nickel hydroxide powder had such a composition that nickel hydroxide contained 0.3 wt % of cobalt and 3.5 wt % of zinc in the form of solid solution. Nickel sulfate, cobalt sulfate and zinc sulfate were dissolved in water at a given ratio to prepare a mixed aqueous solution in which nickel ions, cobalt ions and zinc ions were dissolved. Then, given amounts of this mixed aqueous solution and sodium hydroxide were fed to a reaction tank, while keeping the temperature at 35° C. and the pH value at 11.3, and vigorous stirring was carried out to prepare primary particles of 0.1 μm or less in size. With using the particles as nuclei, nickel hydroxide comprising an aggregate of innumerable primary particles was continuously prepared. The nickel hydroxide powder was washed with water of 50° C. to remove sodium hydroxide or metal salts such as nickel sulfate, and dried at 80° C. According to this method, it is possible to continuously prepare nickel hydroxide without formation of any complex with ammonium. Next, nickel hydroxide powders were continuously prepared in the same manner as above with changing only the pH value in the reaction tank to 11.0, 11.1, 11.5 and 11.6. As shown in FIG. 7, the resulting nickel hydroxide powders had a primary particle size of 0.1 μm or less. The properties of the nickel hydroxide prepared at the various pH values are shown in Table 10.

TABLE 10

Properties of nickel hydroxide

| No. | Reaction pH | Range of pore radius distribution/Å | Tap density g/cm² | Average particle size μm | Specific surface area cm²/g | Void volume ratio % | Total void volume cm³/g |
|---|---|---|---|---|---|---|---|
| A | 11.0 | 10–200 | 2.3 | 10.6 | 8.6 | 17 | 0.01 |
| B | 11.1 | 10–200 | 2.2 | 15.4 | 13.7 | 68 | 0.017 |
| C | 11.3 | 10–200 | 2.1 | 13.3 | 18.3 | 43 | 0.02 |
| D | 11.5 | 10–200 | 1.9 | 8.5 | 22.9 | 25 | 0.04 |
| E | 11.6 | 10–200 | 1.8 | 6.8 | 25.6 | 78 | 0.06 |

The "void volume ratio" in Table 10 is of the void volume of 30 Å or more in pore radius to the total void volume of 10–200 Å in pore radius. The nickel hydroxide powders of Nos. A–E contained 3.45 wt % of Zn and 0.32 wt % of Co according to the atomic absorption spectrometry. A pore distribution of less than 10 Å is difficult to measure according to the method of adsorption with nitrogen gas, and it is considered that voids having pores of less than 10 Å were actually present. The tap density was measured in the same manner as in Example 1. Next, positive electrodes were made using these five kinds of nickel hydroxide powders No. A–E. The respective nickel hydroxide powders, cobalt powders and cobalt hydroxide powders were mixed at a weight ratio of 100:7:5. Water was added to the mixture, which was then kneaded to prepare a paste. A sponge-like nickel porous body support having a porosity of 95% and a surface density of 300 g/m² was filled with the paste and dried. The porous body was pressed and immersed in an aqueous solution in which fluoro resin powders were dispersed. Thereafter, the porous body was again dried and then cut to a given size to make a nickel positive electrode having a capacity of 1400 mAh.

A negative electrode was made in the following manner. Alloy composition was 3.6 MmNi, 0.7 Co, 0.4 Mn, 0.3 Al (Mm means amish metal which is a mixture of rare earth elements). Mish metal Mm which is a mixture of rare earth elements, Ni, Co, Mn, and Al were charged in an arc furnace and kept at a vacuum of $10^{-4}$–$10^{-5}$ torr and then subjected to arc discharging under a reduced pressure in an argon atmosphere to melt them. For homogenization, the sample was heat treated at 1050° C. for 6 hours under vacuum. The resulting alloy ingot was roughly ground and then, milled by a wet ball mill to obtain powders of 20 μm in average particle size. The powders were subjected to a treatment in a 7.2 mol aqueous potassium hydroxide solution at 80° C. for 1 hour under stirring, then washed with water to remove potassium hydroxide from the alloy powders, and dried to obtain hydrogen absorbing alloy powders to be used for a negative electrode. To the hydrogen absorbing alloy powders were added water and carboxymethyl cellulose (CMC) to obtain a paste. A sponge-like nickel porous body of 95% in porosity was filled with the paste and dried. The porous body was pressed and cut to a given size to obtain a hydrogen absorbing alloy negative electrode. A sulfonated nonwoven fabric comprising polypropylene and polyethylene was used as a separator.

The thus produced negative electrode 1 and positive electrode 2 were wound in a spiral form with providing a separator therebetween and were inserted in case 4 which served also as a negative electrode terminal. Thereafter, 2.4 cm³ of an alkali electrolyte prepared by dissolving 20 g/l of lithium hydroxide in an aqueous potassium hydroxide solution and having a specific gravity of 1.30 was poured into the case and case 4 was sealed by sealing plate 7 provided with safety valve 6 to make an enclosed nickel.hydrogen storage battery of 4/5 A in size having a capacity of 1400 mAh and controlled in its battery capacity by the positive electrode. The structure of the resulting battery is the same as of FIG. 3 shown in Example 1. Five batteries different in nickel hydroxide as positive electrode from those of the above batteries were made in the same construction as of FIG. 3 (corresponding to the above A–E). These batteries were subjected to the test on the utilization factor of the nickel hydroxide active material of the positive electrode under the following conditions. Charging was carried out at a positive electrode capacity of 150% based on the theoretical capacity calculated from the nickel hydroxide active material with a charging current of 0.1 CmA in an atmosphere of 20° C. and was ceased for 1 hour and then continuous discharging was carried out to 1.0 V with a constant discharging current of 0.2 CmA. Such charging and discharging were repeated 5 times and the utilization factor of active material in each cycle was calculated. The utilization factor of active material was calculated by the following formula.

The utilization factor of active material=(discharging capacity to 1.0 V/theoretical capacity of nickel hydroxide)×100

The results of the tests on the active material utilization factor of the batteries in which the nickel hydroxides of J–N were used are shown in Table 11.

TABLE 11

Utilization factor in 1-5 cycles of various nickel hydroxides

| No. | Utilization factor/% | | | | |
|---|---|---|---|---|---|
| | 1 cycle | 2 cycles | 3 cycles | 4 cycles | 5 cycles |
| J | 80 | 82 | 85 | 85 | 85 |
| K | 90 | 92 | 94 | 95 | 95 |
| L | 93 | 95 | 98 | 98 | 98 |
| M | 92 | 94 | 97 | 97 | 97 |
| N | 95 | 93 | 90 | 88 | 86 |

As can be seen from Table 11, the utilization factor of nickel hydroxide of No. J was 80% in the first cycle and was 85% after repetition of 5 cycles of charging and discharging. This is because the void volume having a pore radius of 30 Å or more was 17% of total void volume. This correlates with the small specific surface area of 8.6 m²/g and the small total void volume of 0.01 cm²/g. Therefore, penetration of the electrolyte into pores of nickel hydroxide particles was difficult and, as a result, the effective nickel hydroxide participating in the charging and discharging reactions decreased and the utilization factor in the first cycle was small, namely, 80%. The utilization factor was improved only about 5% even if the charging and discharging cycle was repeated. The nickel hydroxide powders of No. N had a void volume ratio of 78%, a specific surface area of 25.6 m² and a total void volume of 0.06 cm³/g. Therefore, the nickel hydroxide powders could contain the electrolyte sufficiently and had a high utilization factor of 95% in the first cycle. However, tap density was low, namely, 1.8 g/cm³. Therefore the filling properties decreases and the packing density, namely, volume density decreases. From the above, an excellent utilization factor of active material is exhibited when nickel hydroxide has a pore radius of 10–200 Å and a void volume ratio of 20–70%. Spherical nickel hydroxide particles having such characteristics can be obtained by controlling the reaction pH to 11.3±0.2. The BET specific surface area and void volume of pores have correlation with void volume ratio and it is preferred to control the specific surface area and the void volume to 10–20 m²/g and 0.015–0.04 cm³/g shown in Nos. K, L and M of the present invention. Furthermore, the tap density and average particle size of the nickel hydroxide powders are important for the filling properties of electrode, and when the tap density is small, the packing density, namely, volume density of nickel hydroxide in electrode decreases, and the substantial battery capacity decreases. The average particle size concerns the viscosity of a paste containing nickel hydroxide and the paste can be charged into or coated on a support by controlling to proper particle size. Therefore, the tap density and average particle size are preferably 1.9 g/cm³ or more and 7–20 μm, respectively.

EXAMPLE 7

Positive electrodes as shown in Table 12 were produced using the same nickel hydroxide powders of No. L of Example 6 and in the same manner as in Example 1.

TABLE 12

Composition of positive electrode (weight ratio)

| No. | Nickel hydroxide | Cobalt | Cobalt hydroxide | Zinc oxide |
|---|---|---|---|---|
| O | 100 | 0 | 0 | 0 |
| P | 100 | 9 | 0 | 0 |
| Q | 100 | 7 | 5 | 0 |
| R | 100 | 7 | 5 | 3 |

Then, the same batteries as of Example 6 were produced using the positive electrodes Nos. O–R in combination with the negative electrode used in Example 6. These batteries were subjected to the tests on the utilization factor of nickel hydroxide which is a positive active material and the charging and discharging cycle life under the following conditions. Charging was carried out at positive electrode capacity of 150% based on the theoretical capacity calculated from the nickel hydroxide active material with a charging current of 0.1 CmA in an atmosphere of 20° C. and was ceased for 1 hour and then continuous discharging was carried out to 1.0 V with a constant discharging current of 0.2 CmA. Such charging and discharging were repeated twice, and the utilization factor of active material in the second cycle was calculated. The utilization factor of active material was calculated by the following formula.

Utilization factor of active material=(discharging capacity to 1.0 V/theoretical capacity of nickel hydroxide)×100

The charging and discharging cycle life was determined in the following manner. That is, charging was carried out with a charging current of 1 CmA for 1.3 hour in an atmosphere of 0° C. and, thereafter, continuous discharging was carried out to 1.0 V with a discharging current of 1.0 CmA. Charging and discharging were repeated under the above conditions and when discharging time reduced to 60% of the initial continuous discharging time, the number of cycles at that point was taken as cycle life. The results of the active material utilization factor and cycle life of Nos. O–R are shown in Table 13.

TABLE 13

Active material utilization factor and cycle life

| No. | Active material utilization factor | Cycle life |
|---|---|---|
| O | 82.3% | 590 cycles |
| P | 95.5% | 525 cycles |
| Q | 95.0% | 530 cycles |
| R | 94.8% | 750 cycles |

When the nickel hydroxide powders of the present invention shown in Example 6 were used, also the active material utilization factor and the charging and discharging cycle life characteristics differed depending on the composition of the positive electrode shown in Table 12. When the positive electrode was constructed of only the nickel hydroxide powders No. O of the present invention, the active material utilization factor was low, namely, 82.3%. On the other hand, when the positive electrodes Nos. P–R were used, the active material utilization factor was excellent, namely, 94.8–95.5%. When the nickel hydroxide of the present invention is used, it is necessary for improving the utilization factor to allow cobalt or cobalt hydroxide to be present together with nickel hydroxide. The amounts of cobalt and cobalt hydroxide added are preferably 4–18 parts by weight and 0–10 parts by weight based on 100 parts by weight of nickel hydroxide powders from the point of substantial discharging capacity, respectively. That is, if the amount of cobalt is less than 4 parts by weight, the utilization factor reduces and the substantial discharging capacity reduces. If the amount of cobalt is more than 18 parts by weight, the active material utilization factor is superior, namely, at least 95%, but the substantial capacity reduces because the packing density reduces. The amount of cobalt hydroxide added shows aa similar tendency and hence, the above-mentioned range is preferred.

With reference to the charging and discharging cycle life, at least 500 cycles of charging and discharging were possible even in an atmosphere of 0° C. if the positive electrodes had the compositions of No. O–R. When the positive electrode No. R containing zinc oxide was used, the cycle life was very good, namely, 750 cycles. Therefore, in order to obtain further superior cycle life characteristics, it is necessary to allow zinc oxide to be present together with nickel hydroxide powders. The amount of zinc oxide added is suitably 0–10 parts by weight based on 100 parts by weight of nickel hydroxide. If it is more than 10 parts by weight, the active material utilization factor decreases to less than 90%. Cadmium oxide, cadmium, zinc, etc. have a similar effect to improve the cycle life, and the amount of them is preferably within the range of 0–10 parts by weight.

In this example, a sponge-like nickel porous body having a surface density of 300 g/m$^2$ was used as a support, but a similar effect is exhibited when the surface density is within the range of 200–700 g/m$^2$. Further, a punching metal or a flat sheet which is a kind of three-dimensional porous body show the same effect as the sponge-like nickel porous body.

As explained above, according to the present invention, the nickel hydroxide active material powders used for a positive electrode comprise a mixture of spherical or nearly spherical particles and non-spherical particles which contains 1–7 wt % of at least one of cadmium, zinc, calcium, magnesium, iron, cobalt and manganese in the nickel hydroxide active material powders. Furthermore, the present invention provides a nickel positive electrode comprising a three-dimensional porous body or a flat sheet which imparts electrical conductivity and supports nickel hydroxide powders, wherein the nickel positive electrode is composed of nickel hydroxide powders comprising a mixture of spherical or nearly spherical particles and non-spherical particles which contains 1–7 wt % of at least one of cadmium, zinc, calcium, magnesium, iron, cobalt and manganese in the nickel hydroxide active material powders and at least one of cobalt, cobalt hydroxide, zinc oxide, zinc, cadmium and cadmium oxide. Moreover, the nickel hydroxide active material powders comprises an aggregate of innumerable primary particles of 0.1 µm or less which comprises the nickel hydroxide active material powders containing 1–7 wt % of at least one of cadmium, zinc, calcium, magnesium, iron, cobalt and manganese and in which void volume having a pore radius of at least 30 Å is 20–70% of the total void volume. The present invention further provides an alkali storage battery comprising a nickel positive electrode mainly composed of a nickel oxide, a negative electrode mainly composed of a hydrogen absorbing alloy capable of carrying out electrochemical absorbing and desorbing reaction of hydrogen or a negative electrode mainly composed of cadmium oxide, an alkali electrolyte, a separator, a case which contain them and a sealing plate provided with a safety valve wherein the nickel positive electrode mainly composed of a three-dimensional porous body or a flat plate which imparts electrical conductivity and supports nickel hydroxide powders comprising a mixture of spherical or nearly spherical particles and non-spherical particles which contains 1–7 wt % of at least one of cadmium, zinc, calcium, magnesium, iron, cobalt and manganese in the nickel hydroxide active material powders and at least one of cobalt, cobalt hydroxide, zinc oxide, zinc, cadmium and cadmium oxide, the alkali electrolyte has a specific gravity of 1.23–1.4, and the amount of the electrolyte per 1 Ah of battery capacity is 1.0–2.0 cm$^3$/Ah before the initial charging and discharging. By such simple construction, there can be provided nickel hydroxide, a nickel positive electrode and an alkali storage battery in which the packing density of the nickel hydroxide active material is high, the energy density is excellent and besides, the utilization factor and the cycle life at low temperatures are improved. Further, since amounts is not used in preparation of the powders, alkali storage battery excellent in self-discharging characteristics can be provided.

In the nickel positive electrode of the present invention, at least one of cadmium, calcium, zinc, magnesium, iron, cobalt and manganese may be present in the form of a solid solution inside the crystal of the nickel hydroxide powder and this solid solution means one in which at least one of them is substituted for a part of nickel of the nickel hydroxide of one which is a mixed crystal of hydroxide of at least one of the above metals and nickel hydroxide.

What is claimed is:

1. A nickel hydroxide active material powder for use in making nickel positive electrodes, which is a mixture of spherical or nearly spherical particles having a particle size of about 10–30 µm and non-spherical particles having a particle size of less than about 10 µm which comprises a nickel hydroxide powder containing 1–7 wt % of at least one metal selected from the group consisting of cadmium, calcium, zinc, magnesium, iron, cobalt and manganese before production of positive electrodes and is an aggregate of innumerable primary particles of 0.1 µm or less.

2. A nickel hydroxide active material powder according to claim 1, which is an aggregate of innumerable primary particles of 0.1 µm or less.

3. A nickel hydroxide active material powder according to claim 1, wherein at least one metal selected from the group consisting of cadmium, calcium, zinc, magnesium, iron, cobalt and manganese is present as a solid solution inside the crystal of the nickel hydroxide active material powder.

4. A nickel hydroxide active material powder according to claim 1, which contains 3–7 wt % of zinc and 0.1–1 wt % of cobalt.

5. A nickel hydroxide active material powder according to claim 1, which has an average particle size of 7–20 µm and a tap density of at least 1.9 g/cm$^3$.

6. A nickel hydroxide active material powder according to claim 1, which has a BET specific surface area of 10–20 m$^2$/g measured by adsorption of nitrogen gas.

7. A nickel hydroxide active material powder according to claim 1, which has a void volume of 0.015–0.04 cm$^3$/g measured by adsorption of nitrogen gas.

8. A nickel hydroxide active material powder according to claim 1, which has a void volume having a pore radius of 30 Å or more of at least 20% based on total void volume which is calculated from adsorption isotherm of adsorption side of nitrogen gas.

9. A nickel hydroxide active material powder according to claim 1, which is continuously obtained from sodium hydroxide and a mixed aqueous solution of nickel sulfate and a sulfate or nitrate of at least one metal selected from the group consisting of cadmium, calcium, zinc, magnesium, iron, cobalt and manganese by adjusting reaction pH to 11.3±0.2 and reaction temperature to 30°–40° C. and by controlling the residence time and the stirring condition in a reaction tank.

10. A nickel hydroxide active material for nickel positive electrodes which comprises a nickel hydroxide powder containing 1–7 wt % of at least one metal selected from the group consisting of cadmium, calcium, zinc, magnesium, iron, cobalt and manganese, is an aggregate of innumerable primary particles of 0.1 μm or less, and has a void volume having a pore radius of 30 Å or more of 20–70% based on total void volume.

11. A nickel hydroxide active material according to claim 10, wherein the nickel hydroxide active material powder is a mixture of spherical or nearly spherical particles and non-spherical particles.

12. A nickel hydroxide active material according to claim 10, wherein the nickel hydroxide active material powder has a BET specific surface area of 10–20 m$^2$/g measured by adsorption of nitrogen gas.

13. A nickel hydroxide active material according to claim 10, wherein the nickel hydroxide active material powder has an average particle size of 7–20 μm and a tap density of at least 1.9 g/cm$^3$.

14. A nickel hydroxide active material according to claim 10, wherein the nickel hydroxide active material powder has a void volume of 0.015–0.04 cm$^3$/g.

15. A nickel hydroxide active material according to claim 10, which is a powder obtained from an aqueous sodium hydroxide solution and a mixed aqueous solution of nickel sulfate, zinc sulfate and cobalt sulfate by adjusting the pH to 11.3±0.2 in production of nickel hydroxide.

16. A nickel positive electrode which comprises a three-dimensional porous body or a flat sheet which supports a nickel hydroxide active material mainly composed of nickel powder and which imparts electric conductivity wherein the nickel hydroxide active material comprises a mixture of spherical or nearly spherical particles having a particle size of about 10–30 μm and non-spherical particles having a particle size of less than about 10 μm which comprises a nickel hydroxide powder containing 1–7 wt % of at least one metal selected from the group consisting of cadmium, calcium, zinc, magnesium, iron, cobalt and manganese and a powder of at least one member selected from the group consisting of cobalt, cobalt oxide, zinc oxide, zinc, cadmium and cadmium oxide and is an aggregate of innumerable primary particles of 0.1 μm or less.

17. A nickel positive electrode according to claim 16, wherein weight ratio of nickel hydroxide:cobalt:cobalt hydroxide:zinc oxide and/or cadmium oxide:cadmium and/or zinc is 100:4–18:0–10:0–10:0–10.

18. A nickel positive electrode according to claim 16, wherein the three-dimensional porous body is a sponge-like nickel porous body or a punching metal.

19. A nickel positive electrode according to claim 16, wherein the flat sheet is a nickel foil or a nickel-plated iron foil.

20. A nickel positive electrode according to claim 18, wherein the sponge-like nickel porous body has a density of 200–700 g/m$^2$.

21. A nickel positive electrode according to claim 16, wherein the nickel hydroxide powder is an aggregate of innumerable primary particles of 0.1 μm or less.

22. A nickel positive electrode according to claim 16, wherein at least one metal selected from the group consisting of cadmium, calcium, zinc, magnesium, iron, cobalt and manganese is present as a solid solution inside the crystal of the nickel hydroxide active material powder.

23. A nickel positive electrode according to claim 16, wherein the nickel hydroxide active material powder contains 3–7 wt % of zinc and 0.1–1 wt % of cobalt.

24. A nickel positive electrode according to claim 16, wherein the nickel hydroxide active material powder has an average particle size of 7–20 μm and a tap density of at least 1.9 g/cm$^3$.

25. A nickel positive electrode according to claim 16, wherein the nickel hydroxide powder has a BET specific surface area of 10–20 m$^2$/g measured by adsorption of nitrogen gas.

26. A nickel positive electrode according to claim 16, wherein the nickel hydroxide powder has a void volume of 0.015–0.04 cm$^3$/g measured by adsorption of nitrogen gas.

27. A nickel positive electrode according to claim 16, wherein the nickel hydroxide powder has a void volume having a pore radius of 30 Å or more of at least 20% based on total void volume which is calculated from adsorption isotherm of adsorption side of nitrogen gas.

28. A nickel positive electrode according to claim 16, wherein he nickel hydroxide powder is obtained from sodium hydroxide and a mixed aqueous solution of nickel sulfate and a sulfate or a nitrate of at least one metal selected from the group consisting of cadmium, calcium, zinc, magnesium, iron, cobalt and manganese by controlling the reaction pH and reaction temperature.

29. A nickel positive electrode according to claim 16, wherein the reaction pH is 11.3±0.2 and the reaction temperature is 30°–40° C.

30. A nickel positive electrode according to claim 16, which contains a powder having water repellency.

31. An alkali storage battery comprising a nickel positive electrode mainly composed of nickel oxide, a negative electrode mainly composed of a hydrogen absorbing alloy capable of carrying out electrochemical hydrogen absorbing and desorbing reaction or a negative electrode mainly composed of cadmium oxide, an alkali electrolyte, a separator, a case containing these electricity generating elements and a sealing plate provided with a safety vent wherein before initial charging and discharging, said nickel positive electrode is mainly composed of a three dimensional porous body or a flat sheet which imparts electrical conductivity and supports nickel hydroxide powders comprising a mixture of spherical or nearly spherical particles having a particle size of about 10–30 μm and non-spherical particles having a particle size of less than about 10 μm which comprises nickel hydroxide powders containing 1–7 wt % of at least one metal selected from the group consisting of cadmium, calcium, zinc, magnesium, iron, cobalt and manganese and additionally containing a powder of at least one member selected from the group consisting of cobalt, cobalt oxide, zinc oxide, zinc, cadmium, and cadmium oxide and is an aggregate of innumerable primary particles of 0.1 μm or less, the specific gravity of the alkali electrolyte is 1.23–1.4, and the amount of the electrolyte per 1 Ah of battery capacity is 1.0–2.0 cm$^3$/Ah.

32. An alkali storage battery according to claim 31, wherein weight ratio of nickel hydroxide:cobalt:cobalt hydroxide:zinc oxide and/or cadmium oxide:cadmium and/or zinc is 100:4–18:0–10:0–10:0–10.

33. An alkali storage battery according to claim 31, wherein the three-dimensional porous body is a sponge-like nickel porous body or a punching metal.

34. An alkali storage battery according to claim 31, wherein the flat sheet is a nickel foil or a nickel-plated iron foil.

35. An alkali-storage battery according to claim 31, wherein the sponge-like nickel porous body has a density of 200–700 g/m².

36. An alkali storage battery according to claim 31, wherein the nickel positive electrode contains powders having water repellency.

37. An alkali storage battery according to claim 31, wherein the nickel hydroxide powder is an aggregate of innumerable primary particles of 0.1 μm or less.

38. An alkali storage battery according to claim 31, wherein at least one metal selected from the group consisting of cadmium, calcium, zinc, magnesium, iron, cobalt and manganese is present as a solid solution inside the crystal of the nickel hydroxide active material powder.

39. An alkali storage battery according to claim 31, wherein the nickel hydroxide active material powder contains 3–7 wt % of zinc and 0.1–1 wt % of cobalt.

40. An alkali storage battery according to claim 31, wherein the nickel hydroxide active material powder has an average particle size of 7–20 μm and a tap density of at least 1.9 g/cm³.

41. An alkali storage battery according to claim 31, wherein the nickel hydroxide powder has a BET specific surface area of 10–20 m²/g measured by adsorption of nitrogen gas.

42. An alkali storage battery according to claim 31, wherein the nickel hydroxide powder has a void volume of pores of 0.015–0.04 cm³/g measured by adsorption of nitrogen gas.

43. An alkali storage battery according to claim 31, wherein the nickel hydroxide powder has a void volume having a pore radius of 30 Å or more of at least 20% based on total void volume which is calculated from adsorption isotherm of adsorption side of nitrogen gas.

44. An alkali storage battery according to claim 31, wherein the nickel hydroxide active material is obtained from sodium hydroxide and a mixed aqueous solution of nickel sulfate and a sulfate or a nitrate of at least one metal selected from the group consisting of cadmium, calcium, zinc, magnesium, iron, cobalt and manganese by controlling reaction pH and reaction temperature.

45. An alkali storage battery according to claim 44, wherein the reaction pH is 11.3±0.2 and the reaction temperature is 30–40° C.

46. An alkali storage battery according to claim 31, wherein the electrolyte comprises at least one compound selected from the group consisting of potassium hydroxide and sodium hydroxide and lithium hydroxide.

47. An alkali storage battery according to claim 46, wherein the electrolyte contains lithium hydroxide (LiOH) in an amount of at least 10 g/l.

48. An alkali storage battery according to claim 31, wherein zincate ion is present in the alkali electrolyte.

49. An alkali storage battery according to claim 31, wherein the separator is a nonwoven fabric subjected to sulfonation treatment.

50. An alkali storage battery according to claim 31, wherein actuating pressure of the safety vent provided at the sealing plate is 5–30 kg/cm³.

* * * * *